(12) United States Patent
Hamilton (10) Patent No.: US 11,730,081 B1
(45) Date of Patent: Aug. 22, 2023

(54) ERGONOMIC GRIP FOR WEED TRIMMER

(71) Applicant: Robbie Hamilton, Huntsville, AL (US)

(72) Inventor: Robbie Hamilton, Huntsville, AL (US)

( * ) Notice: Subject to any disclaimer, the term of this patent is extended or adjusted under 35 U.S.C. 154(b) by 336 days.

(21) Appl. No.: 17/113,767

(22) Filed: Dec. 7, 2020

Related U.S. Application Data (63) Continuation of application No. 16/399,464, filed on Apr. 30, 2019, now abandoned.

(60) Provisional application No. 62/764,427, filed on Aug. 2, 2018, provisional application No. 62/762,861, filed on May 24, 2018.

(51) Int. Cl.
*A01D 34/90* (2006.01)
*A01D 34/82* (2006.01)
*A01B 1/02* (2006.01)
*B25F 5/02* (2006.01)

(52) U.S. Cl.
CPC ............ *A01D 34/902* (2013.01); *A01B 1/026* (2013.01); *A01D 34/824* (2013.01); *B25F 5/026* (2013.01); *A01D 34/90* (2013.01)

(58) Field of Classification Search
CPC .... A01D 34/902; A01D 34/824; A01D 34/90; A01B 1/026; B25F 5/024; B25F 5/026
See application file for complete search history.

(56) References Cited

U.S. PATENT DOCUMENTS

| | | | | |
|---|---|---|---|---|
| 85,956 A | * | 1/1869 | Pinkham | A47L 11/4038 15/247 |
| 1,534,075 A | * | 4/1925 | Parrish | A01B 1/026 294/58 |
| 1,586,056 A | * | 5/1926 | Walsh | A01B 1/026 294/58 |
| 2,244,585 A | * | 6/1941 | Tweit | A01B 1/00 294/58 |
| 3,781,991 A | * | 1/1974 | Stretton | A01D 34/902 30/276 |
| 4,179,805 A | * | 12/1979 | Yamada | B27B 17/0008 30/296.1 |
| 4,226,021 A | * | 10/1980 | Hoff | A01D 34/902 30/276 |
| 4,282,652 A | * | 8/1981 | Ballas, Sr. | A01D 34/902 30/276 |
| 4,288,171 A | * | 9/1981 | Kottke | A01G 3/00 403/389 |
| 4,364,435 A | * | 12/1982 | Tuggle | A01G 3/062 30/296.1 |

(Continued)

*Primary Examiner* — Jeffrey O'Brien
(74) *Attorney, Agent, or Firm* — Bradley Arant Boult Cummings LLP (57) ABSTRACT

The present disclosure provides a handle attachment for attaching to a main shaft of a weed trimmer. The handle attachment comprises a clamping mechanism, a shaft coupled to the clamping mechanism, and a grip coupled to the shaft. The clamping mechanism is configured to be coupled to the main shaft of the weed trimmer closer to a distal end of the main shaft than to the proximal end of the main shaft. The shaft is configured to extend towards the proximal end of the main shaft and at least partially above the main shaft. The grip is configured to be positioned closer to the proximal end of the main shaft than to the distal end of the main shaft. The grip is further positioned above a standard weed trimmer and perpendicular the main shaft. Positioning the grip above the standard grip reduces back and hip strain on the user.

18 Claims, 10 Drawing Sheets

(56) References Cited

U.S. PATENT DOCUMENTS

| | | | | |
|---|---|---|---|---|
| RE32,266 E | * | 10/1986 | Tuggle | A01D 34/84 172/15 |
| 4,838,465 A | * | 6/1989 | Metzger | E04G 21/04 222/526 |
| 4,958,407 A | * | 9/1990 | Johnson | B25G 1/102 294/58 |
| 5,065,475 A | * | 11/1991 | Watt | A01D 7/00 294/58 |
| 5,411,305 A | * | 5/1995 | Revoldt | B25G 3/24 294/58 |
| 5,496,085 A | * | 3/1996 | Middleton | B25G 1/00 294/58 |
| 5,499,852 A | * | 3/1996 | Seigendall | B25G 1/00 294/58 |
| 5,661,960 A | * | 9/1997 | Smith | A01D 34/902 56/DIG. 18 |
| 5,740,613 A | * | 4/1998 | Swistun | A01D 34/902 30/296.1 |
| 6,082,087 A | * | 7/2000 | Tada | A01G 3/06 56/DIG. 18 |
| 6,283,522 B1 | * | 9/2001 | Renaud | B25G 1/00 294/58 |
| 6,485,076 B1 | * | 11/2002 | Chang | B25G 1/00 294/58 |
| 6,536,117 B2 | * | 3/2003 | Schweigert | A01D 34/902 30/276 |
| 6,581,246 B1 | * | 6/2003 | Polette | A01D 34/90 16/444 |
| 6,701,623 B2 | * | 3/2004 | Sanders | A01G 3/062 30/296.1 |
| 7,331,620 B2 | * | 2/2008 | Wang | A01B 1/026 403/379.5 |
| 8,562,238 B2 | * | 10/2013 | Hasei | B25F 5/02 403/396 |
| 8,667,648 B2 | * | 3/2014 | Vierck | B25F 5/026 30/296.1 |
| 9,775,272 B1 | * | 10/2017 | Gilbert | A01B 1/026 |
| 9,918,429 B1 | * | 3/2018 | Di Lallo | A01B 1/026 |
| 9,943,953 B2 | * | 4/2018 | Fritz | B25G 1/06 |
| 10,694,672 B2 | * | 6/2020 | Eiserer | A01D 34/416 |
| 2003/0074765 A1 | * | 4/2003 | Quimby | A01B 1/00 16/426 |
| 2003/0126749 A1 | * | 7/2003 | Sanders | A01G 3/062 30/296.1 |
| 2006/0123634 A1 | | 6/2006 | Peterson et al. | |
| 2006/0123635 A1 | * | 6/2006 | Hurley | A01D 34/902 30/276 |
| 2009/0038283 A1 | * | 2/2009 | Hurley | A01D 34/84 56/12.7 |
| 2009/0188354 A1 | * | 7/2009 | Harris | A01D 34/902 172/14 |
| 2009/0272778 A1 | * | 11/2009 | Hurley | A01D 34/902 224/637 |
| 2010/0031515 A1 | * | 2/2010 | Hurley | A01D 34/902 30/276 |
| 2010/0088902 A1 | * | 4/2010 | Hurley | A01D 34/902 30/286 |
| 2011/0203118 A1 | * | 8/2011 | Saito | A01D 34/902 30/276 |
| 2012/0085205 A1 | * | 4/2012 | Quick | A01D 34/824 81/489 |
| 2012/0168289 A1 | * | 7/2012 | Ito | A01D 34/902 200/61.85 |
| 2013/0142563 A1 | * | 6/2013 | Sumi | A01D 34/902 403/109.1 |
| 2013/0247386 A1 | * | 9/2013 | Ishikawa | A01D 34/90 30/296.1 |
| 2014/0013542 A1 | * | 1/2014 | Wang | A01D 34/90 16/429 |
| 2014/0208597 A1 | * | 7/2014 | Zhou | A01D 34/90 30/276 |
| 2014/0260839 A1 | * | 9/2014 | Hurley | B25F 5/026 81/489 |
| 2015/0313079 A1 | * | 11/2015 | Wang | A01D 34/902 30/275.4 |
| 2015/0334917 A1 | * | 11/2015 | Durden | A01D 34/84 16/24 |
| 2017/0273239 A1 | * | 9/2017 | Ota | A01D 34/68 |
| 2018/0103584 A1 | * | 4/2018 | Orton | A01D 34/416 |
| 2018/0332766 A1 | * | 11/2018 | Ackerman | A01D 34/902 |
| 2018/0359899 A1 | * | 12/2018 | Cote | A01B 1/028 |
| 2020/0171644 A1 | * | 6/2020 | Piotrowski | A01B 1/026 |
| 2020/0296891 A1 | * | 9/2020 | Bohrer | B25F 5/026 |

\* cited by examiner

FIG. 1

Prior Art

ERGONOMIC GRIP FOR WEED TRIMMER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: U.S. patent application Ser. No. 16/399,464 filed Apr. 30, 2019, entitled "Ergonomic Grip For Weed Trimmer," which claims priority to U.S. Provision Patent Application Serial No. 62/762,861 filed May 24, 2018 and U.S. Provisional Patent Application Ser. No. 62/764,427 filed on Aug. 2, 2018.

BACKGROUND

1. Field of the Invention

This device is an attachment that a user can install onto the main shaft of a weed trimmer, edger, or the like. The attachment may be installed by clamping it onto the length of the main shaft. The attachment allows a user to ergonomically grip the weed trimmer or edger so that the user maintains a more upright position alleviating or reducing back strain and back injury.

2. Description of the Prior Art

A number of grass trimmer grips are disclosed in the prior art for gripping a weed trimmer, edger, or similar device. All grass trimmers and grass edgers commercially available include a standard grip that creates a fulcrum point forcing a user to bend at the waist to trim grass, causing user fatigue.

Di Lallo (U.S. Pat. No. 9,918,429 B1) discloses an ergonomic trimmer handle that attaches to the main shaft of a grass trimmer The trimmer handle comprises a lateral bar that runs perpendicular to the main shaft. The lateral bar extends out approximately two feet. This allows a user to grip both the attachment and the handle installed on the grass trimmer The perpendicular configuration allows a user a more ergonomic grip. This device provides a means for a user to manipulate a grass trimmer with two hands. This device could not be used alone without the standard grip. A standard grip requires a user to bend at the waist to trim the grass, causing user fatigue.

Smith et al. (U.S. Pat. No. 5,661,960) discloses a handle assembly that provides a forearm rest, a first handle in line with the forearm rest, and a second handle positioned to a side of the forearm rest and first handle. The device of Smith et al. allows a user to control a grass trimmer using two hands while the forearm of the first handle acts as a fulcrum for the device. Users of this device suffer from strain and fatigue along their forearm, which is maintained as the fulcrum of the device. Additionally, users suffer strain and fatigue at the waist because the device requires a user must rotate about the waist in a sweeping motion to cut grass. Additionally, a user must use two hands to sweep the grass trimmer from side to side. It is often difficult for a user to devote both hands to operating a grass trimmer A user may have to stop trimming grass, and put the device down to free up a hand. This device is difficult to use and requires coordination of both hands and a user's forearm to manipulate the device.

A device is needed that can allow a user to trim grass with a gas or electric-powered grass trimmer with minimal waist and arm fatigue. Additionally, an ergonomic device is needed that does not force a user to rotate about the waist reducing waist fatigue.

BRIEF SUMMARY

This device comprises a handle attachment that may be reversibly coupled to an electric-powered or gas-powered grass trimmer, grass edger, or similar tool. The handle device includes an ergonomic grip that is positioned above the standard grip provided with the grass trimmer or edger at purchase. The positioning of the ergonomic grip allows a user to hold the grass trimmer without bending at the waist. The handle attachment clamps or attaches to the main shaft of the grass trimmer or edger closer to the head of the grass trimmer or edger than the standard grip provided with the tool at the time of purchase. The clamping of the device near the head of the grass trimmer or edger moves the fulcrum of the device down the length of the main shaft allowing a user to exert better control over the trimmer or edger during use, which also permits the ergonomic handle to be positioned above the standard grip provided at the time of purchase. If the fulcrum of the grass trimmer or edger is not moved closer to the head of the tool, the ergonomic handle could not be positioned closer to the body of a user because the device would be uncontrollable.

One aspect in accordance with the embodiments disclosed herein is a handle attachment configured to be coupled to a main shaft of a weed trimmer for reducing back strain and increasing control of a trimmer head of the weed trimmer. The main shaft includes a proximal end and a distal end to which the trimmer head is attached opposite the proximal end. The handle attachment comprises a clamping mechanism, a shaft, and a grip. The clamping mechanism is configured to be coupled to the main shaft of the weed trimmer closer to the distal end than to the proximal end. The shaft is coupled to the clamping mechanism and is configured to extend towards the proximal end of the main shaft and at least partially above the main shaft. The grip is coupled to the shaft and is configured to be positioned closer to the proximal end of the main shaft than to the distal end of the main shaft. The grip is further positioned above and perpendicular the main shaft.

In certain embodiments in accordance with this aspect, the grip may be configured to be positioned further above the main shaft than a standard grip of the weed trimmer. The stand grip is positioned closer to the proximal end of the weed trimmer than to the distal end of the weed trimmer. In accordance with this aspect, the grip provides an improved balance point for the weed trimmer as compared to the standard grip when the handle attachment is coupled to the weed trimmer.

In other embodiments in accordance with this aspect, an offset of the grip above the main shaft of the weed trimmer is adjustable. In accordance with this aspect, a position of the shaft may be fixed once coupled to the clamping mechanism.

In other embodiments in accordance with this aspect, the clamping mechanism may be reversibly couplable to the main shaft of the weed trimmer to adjust a position of the shaft relative to the main shaft.

In other embodiments in accordance with this aspect, the shaft may further include a first end configured to be coupled to the clamping mechanism and a second end configured to be coupled to the grip.

In other embodiments in accordance with this aspect, the handle attachment may further comprise a clamping shaft extending from the first end of the shaft and an ergonomic shaft extending from the second end of the shaft parallel to the clamping shaft. The clamping shaft may be configured to be coupled to the clamping mechanism. The ergonomic shaft may be configured to receive the grip.

In other embodiments in accordance with this aspect, the clamping shaft may be rotatably adjustable within the clamping mechanism to adjust and fix an offset of the ergonomic shaft above the main shaft of the weed trimmer.

In other embodiments in accordance with this aspect, each of the clamping shaft and the ergonomic shaft may be positioned perpendicular to the shaft extending between the clamping shaft and the ergonomic shaft.

In other embodiments in accordance with this aspect, the shaft may be a straight shaft.

In other embodiments in accordance with this aspect, the shaft may be an angled shaft having a lower portion angled relative to an upper portion, the lower portion configured to be positioned parallel to the main shaft of the weed trimmer In other embodiments in accordance with this aspect, the shaft may be a curved shaft having multiple curves defined between a first end of the shaft and a second end of the shaft.

In other embodiments in accordance with this aspect, the camping mechanism may define a fulcrum point positioned closer to the distal end of the main shaft than to the proximal end of the main shaft. The fulcrum point may be configured to increase a user's control of the trimmer head as compared to a standard grip of the weed trimmer when the handle attachment is coupled to the weed trimmer.

In other embodiments in accordance with this aspect, the clamping mechanism may be configured to fixedly position the shaft relative to the main shaft of the weed trimmer.

One aspect in accordance with the embodiments disclosed herein is a handle attachment configured to be coupled to a main shaft of a weed trimmer for reducing back strain and increasing control of a trimmer head of the weed trimmer. The main shaft of the weed trimmer includes a proximal end and a distal end to which the trimmer head is attached opposite the proximal end. The weed trimmer further includes a standard grop coupled to the main shaft closer to the proximal end than to the distal end. The handle attachment comprises a clamping mechanism, a shaft, and a grip. The clamping mechanism is configured to be coupled to the main shaft closer to the distal end than to the proximal end. The shaft is coupled to the clamping mechanism and configured to extend towards the proximal end of the main shaft and at least partially above the main shaft. The shaft includes a first end with a clamping shaft extending therefrom and a second end with an ergonomic shaft extending therefrom parallel to the clamping shaft. Both the clamping shaft and the ergonomic shaft configured to be positioned perpendicular to the main shaft of the weed trimmer. The grip coupled to the ergonomic shaft. The clamping mechanism defines a fulcrum point configured to enable a user to more precisely control a position of the trimmer head of the weed trimmer as compared to the standard grip of the weed trimmer.

In certain embodiments in accordance with this aspect, the grip may be configured to be positioned closer to the proximal end of the main shaft of the weed trimmer than to the distal end of the main shaft.

In other embodiments in accordance with this aspect, the ergonomic shaft may be configured to be positioned above and further from the main shaft of the weed trimmer than the standard grip. The grip is configured to be engaged by a user to reduce a back angle of the user of the weed trimmer as compart to engaging the standard grip.

In other embodiments in accordance with this aspect, the clamping mechanism may be configured to fix a position of the shaft relative to the main shaft of the weed trimmer.

In other embodiments in accordance with this aspect, the ergonomic shaft is configured to be positioned further from the main shaft of the weed trimmer than a standard grip of the weed trimmer.

Another aspect in accordance with the embodiments disclosed herein is a method of using a handle attachment. The method comprises step (a) providing the handle attachment coupled to a main shaft of a weed trimmer closer to a distal end of the weed trimmer than to a proximal end of the weed trimmer, the weed trimmer including a standard grip coupled to the main shaft closer of the weed trimmer to the proximal end than to the distal end, and step (b) engaging a grip of the handle attachment to reduce a back angle of the user as compared to gripping the standard grip, the grip positioned closer to the proximal end of the weed trimmer than to the distal end of the weed trimmer and further away from the main shaft of the weed trimmer than the standard grip.

In certain embodiments in accordance with this aspect, step (b) of the method may further comprise increase a user's control of a trimmer head coupled to the distal end of the weed trimmer as compared to engaging the standard grip of the weed trimmer.

In certain embodiments in accordance with this aspect, step (b) of the method may further comprise reducing a back angle of a user as compared to engaging the standard grip of the weed trimmer.

BRIEF DESCRIPTION OF THE SEVERAL VIEWS OF THE DRAWINGS

The invention is described in detail below with reference to the appended drawings.

FIGS. 1 through 13 depict the Ergonomic Grip for Weed Trimmer In the Figures:

FIG. 11 is a top view of the device of FIG. 9, while

DETAILED DESCRIPTION

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extent that any numerical values or other specifics of materials, etc., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an embodiment in the present disclosure, can be, but not necessarily, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same term can be said in more than one way.

Consequently, alternative language and synonyms may be used for any one or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

Figure 1:
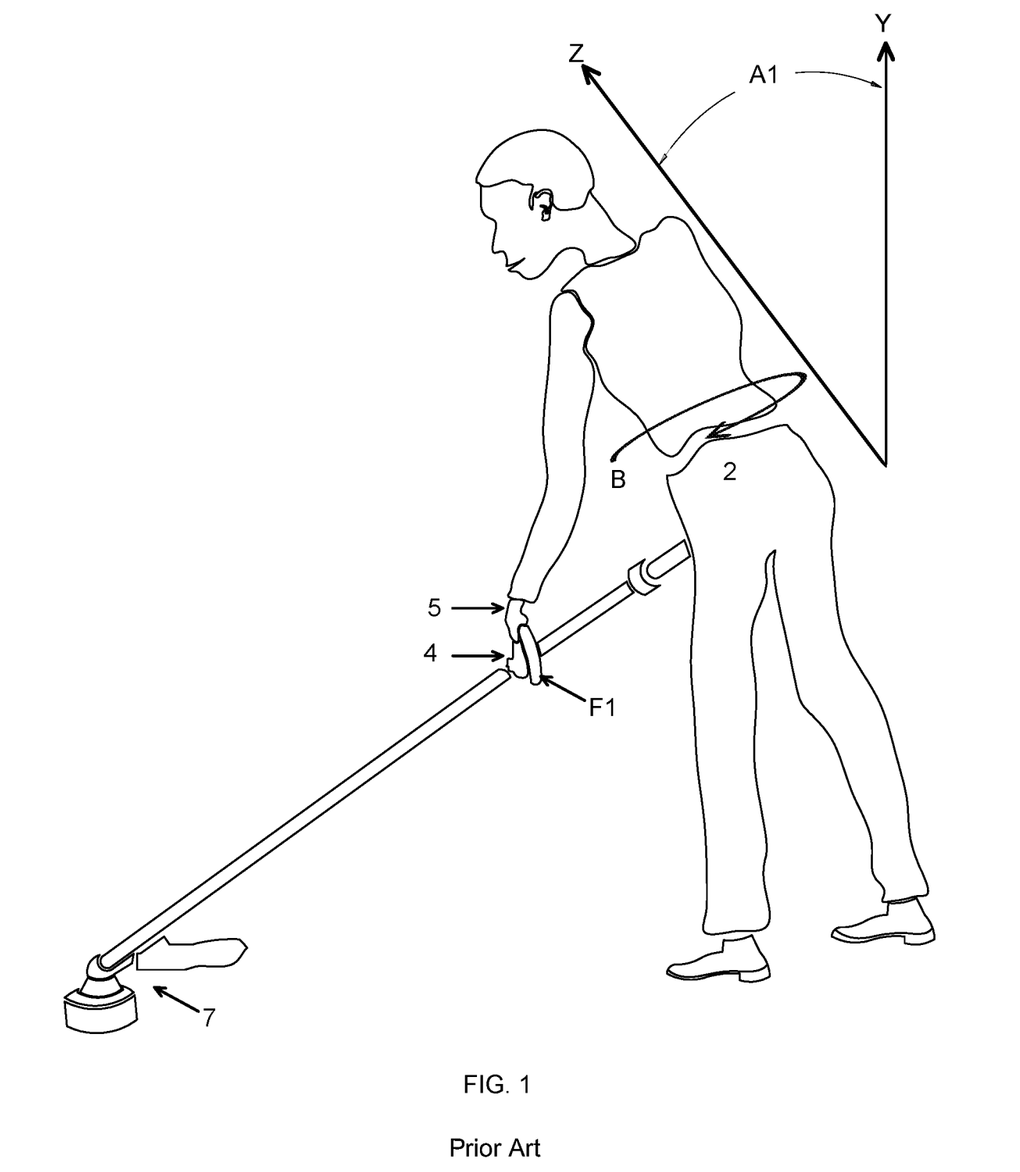
FIG. 1 depicts a user operating a weed trimmer wherein the weed trimmer includes a grip known in the prior art.

FIG. 1 depicts a commercially-available grass and weed trimmer being utilized to trim grass. The handle device disclosed herein may be formed onto a new grass and weed trimmer before the point of first sale to a consumer. Alternately, the handle device may be retrofitted onto a weed trimmer or edger after first sale to a consumer. Note that hand 5 of user 2 grips standard grip 4 that is provided at the time of purchase of the grass trimmer User 2 places his or her right hand (not shown in FIG. 1, only the left hand is shown in FIGS. 1, 2 and 3) on the end of the device that is opposite trimmer head 7. In order to place hand 5 upon standard grip 4, user 2 must rotate about the waist in the B direction. The rotation of user 2 about the waist in the B direction causes stress and strain on the waist and back of user 2. A device is needed that reduces the stress and strain upon the waist and back of user 2 by reducing or eliminating rotation in the B direction at the user's waist while operating a grass trimmer or edger.

The positioning of standard grip 4 along main shaft 16 of the grass trimmer creates fulcrum F1 which is the fulcrum upon which trimmer head 7 is manipulated while operating a grass trimmer or edger. The back of user 2 is rotated from line Y to line Z forming angle A1 during operation of a grass trimmer or edger. Angle A1 is the angle formed between line Z, which is a line projected from the waist of user 2, and line Y, which is perpendicular to the ground upon which user 2 is positioned. The rotation of user 2 about angle A1 causes stress and strain upon the back and arm muscles of user 2. A device is needed that reduces the stress and strain in user 2 that is caused by rotation about angle A1.

Figure 2:
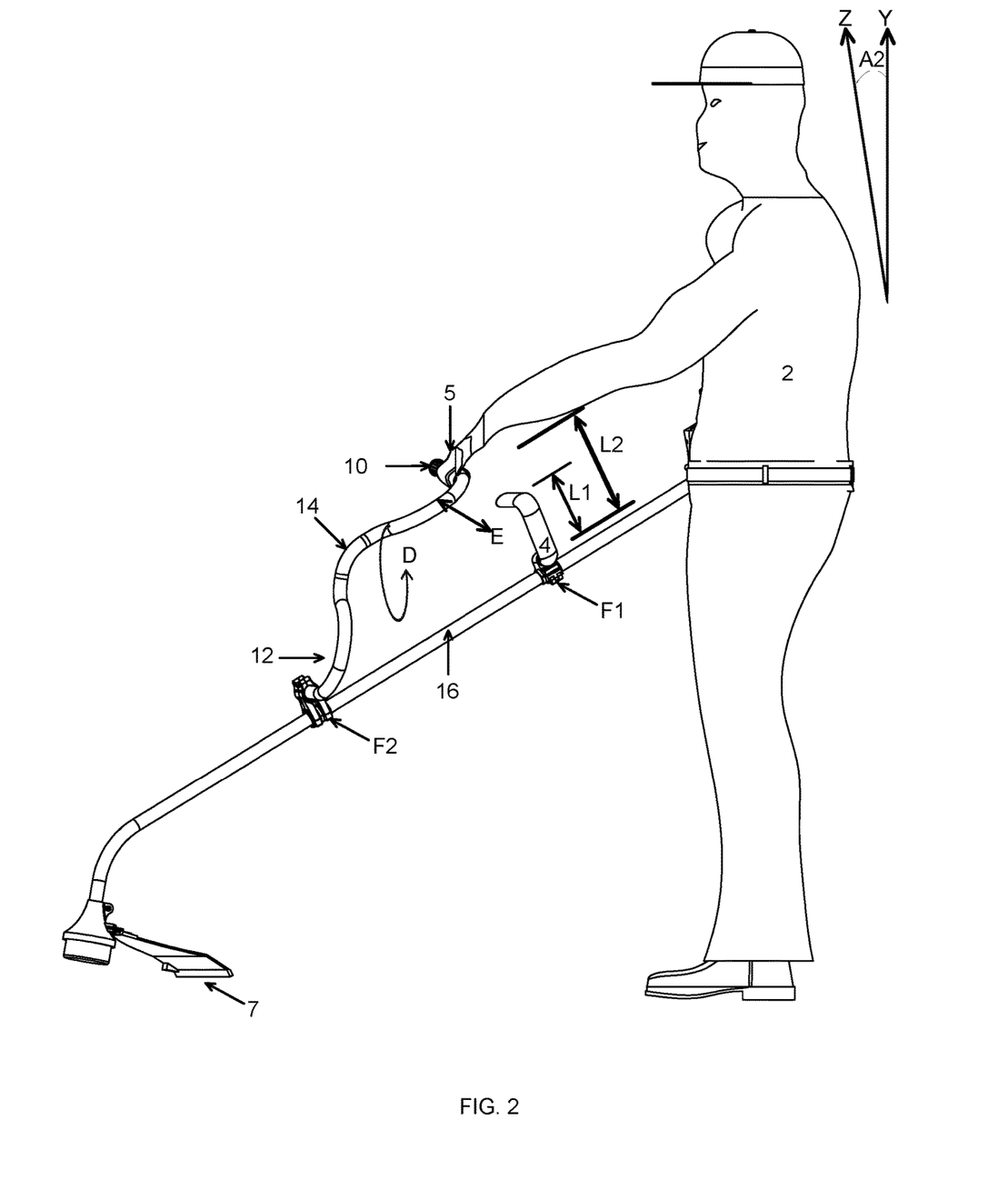
FIG. 2 depicts a user operating the weed trimmer of FIG. 1 wherein the Ergonomic Grip for Weed Trimmer has been installed.

FIG. 2 illustrates user 2 with the Ergonomic Grip for Weed Trimmer attached to main shaft 16 of the grass trimmer (grass trimmer and weed trimmer are used interchangeably). The Ergonomic Grip for Weed Trimmer comprises ergonomic grip 10, clamping mechanism 12, and shaft 14. The device may be formed of aluminum, steel, fiberglass, or any material that is lightweight yet strong enough to support a grass trimmer or grass edger. Ergonomic grip 10 can be formed for left or right-handed individuals. Clamping mechanism 12 may be any means that couples the device onto main shaft 16 of a grass trimmer or edger. Clamping mechanism 12 may allow the device to be reversibly positioned along main shaft 16 at a position and angle that allows user 2 to more comfortably operate the weed trimmer or edger. For example, ergonomic grip 10 may be rotated in the D direction by altering the placement of clamping mechanism 12 about main shaft 16 so that ergonomic grip 10 is positioned to the side of standard grip 4. Ergonomic grip 10 may be positioned in the E direction per user 2 preference so that the ergonomic grip 10 may be parallel or perpendicular to standard grip 4. Ergonomic grip 10 may be any means that allows a user to firmly and comfortably grip the device during use.

Hand 5 of user 2 is positioned upon ergonomic grip 10, which is positioned above standard grip 4. The Ergonomic Grip for Weed Trimmer is clamped onto main shaft 16 so that fulcrum F2 is positioned closer to trimmer head 7 than fulcrum F1, which is formed at standard grip 4, allowing user 2 to have greater control over the movement of trimmer head 7 while operating the weed trimmer or edger.

The distance between hand 5 of user 2 and main shaft 16 is marked length L2. Note that length L2 is significantly longer than length L1, which is the length between a user's hand 5 while gripping standard grip 4 and main shaft 16 (as shown in FIG. 1). The positioning of the Ergonomic Grip for Weed Trimmer device at length L2 reduces the angle which user 2 must bend while trimming or edging, reducing stress and strain on the back of user 2. And, the positioning of a user's hand 5 about the Ergonomic Grip for Weed Trimmer device eliminates the need for user 2 to rotate about the waist as was seen in FIG. 1 wherein user 2 was gripping standard grip 4 (rotation about B, FIG. 1).

The back of user 2 is rotated about angle A2. Angle A2 is the angle formed between line Z, which is a line projected from the waist of user 2, and line Y, which is perpendicular to the ground upon which user 2 is positioned. Note that angle A2 is smaller (fewer radians) than angle A1, which is the angle seen when a user is gripping the trimmer or edger using standard grip 4 (shown in FIG. 1). The change in the position of the back of user 2 from angle A1 to A2 reduces stress and strain on user 2 allowing user 2 to operate the grass trimmer or edger for a longer period of time than when using standard grip 4.

Ergonomic grip 10 may be reversibly, or irreversibly, positioned along main shaft 16 via rotation of shaft 14 at clamping mechanism 12 about angle D. Angle D is the angle upon which the Ergonomic Grip for Weed Trimmer device may be rotated relative to standard grip 4 and main shaft 16. This allows user 2 to position ergonomic grip 10 parallel, perpendicular, or any position between parallel and perpendicular, to standard grip 4. Shaft 14 may be reversibly positioned along line E per user 2 preference. Line E is the line upon which ergonomic grip 10 may be positioned relative to standard grip 4 and main shaft 16. Positioning clamping mechanism 12 about main shaft 16 at fulcrum F2 allows shaft 14 to be positioned and re-positioned along line E.

Figure 3:
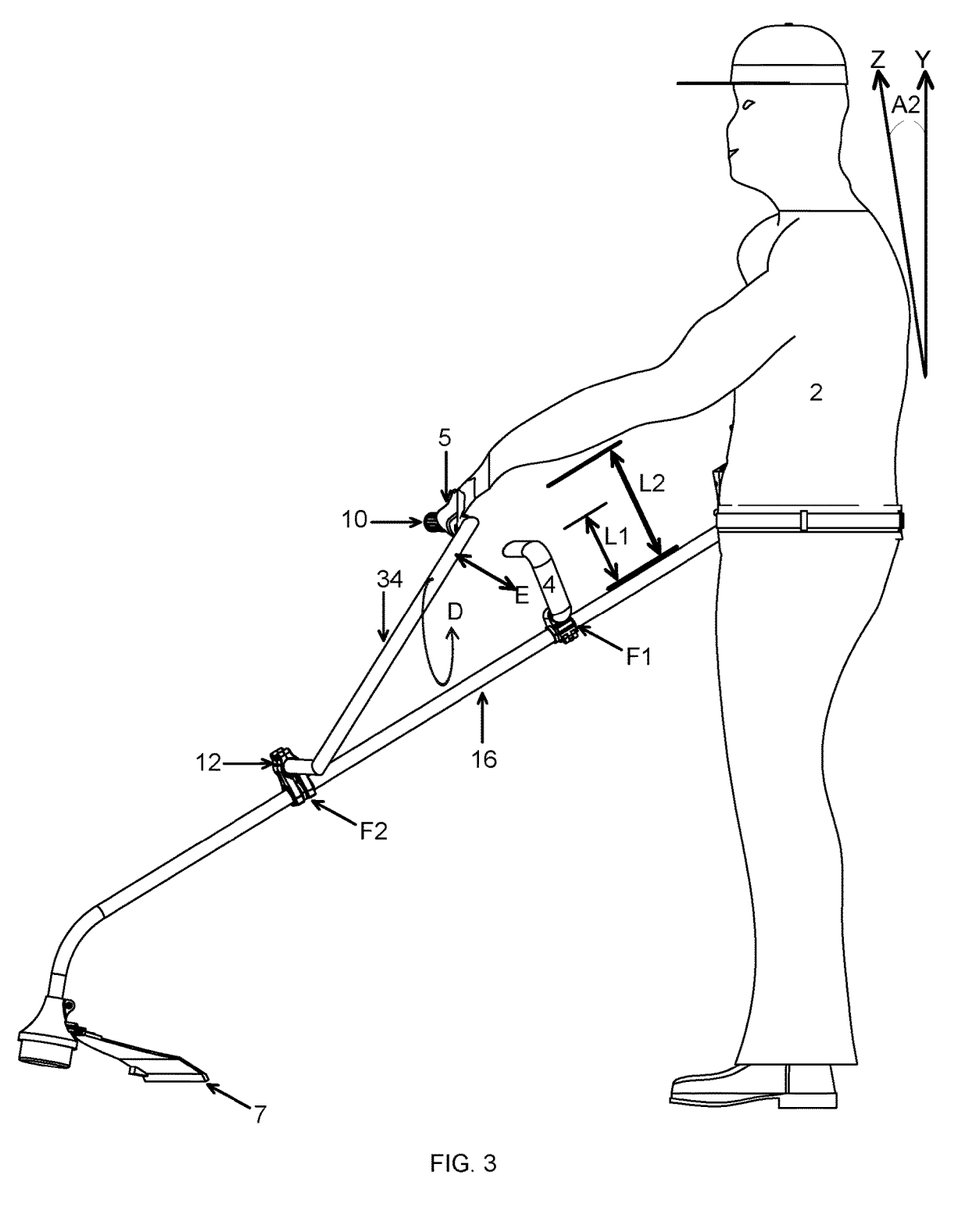
FIG. 3 depicts a user operating the weed trimmer of FIG. 1 wherein an alternate embodiment of the Ergonomic Grip for Weed Trimmer has been installed.

FIG. 3 depicts user 2 with an alternate embodiment of the Ergonomic Grip for Weed Trimmer The Ergonomic Grip for Weed Trimmer comprises ergonomic grip 10, straight shaft 34 and clamping mechanism 12. Hand 5 of user 2 is positioned upon ergonomic grip 10, which is positioned above standard grip 4 providing user 2 with better control of trimmer head 7 while trimming and edging. The Ergonomic Grip for Weed Trimmer is clamped onto main shaft 16 so that fulcrum F2 is positioned closer to trimmer head 7 than fulcrum F1 at standard grip 4. The distance between hand 5 of user 2 and main shaft 16 is marked length L2. As noted for FIG. 2, length L2 is significantly longer than length L1, which is the length between a user's hand 5 while gripping standard grip 4 and main shaft 16 (as shown in FIG. 1). Although the position of a user's hand 5 on standard grip 4 requires user 2 to rotate about the waist when operating the grass trimmer or edger (rotation about B, FIG. 1), a user 2 gripping ergonomic grip 10 does not have to rotate about the waist, reducing stress and strain upon his or her waist and back. The back of user 2 is rotated about angle A2. Angle A2 is the angle formed between line Z, which is a line projected from the waist of user 2, and line Y, which is perpendicular to the ground upon which user 2 is positioned. As previously noted for FIG. 2, angle A2 is smaller (fewer radians) than angle A1, reducing stress and strain on the back of user 2 while trimming and edging. The position of clasping mechanism 12 creates fulcrum F2 which allows a user to have greater control while weed trimming or edging relative to fulcrum F1 formed at the point standard grip 4 is positioned upon main shaft 16.

Ergonomic grip 10 may be reversibly, or irreversibly, positioned along main shaft 16 via rotation of straight shaft 34 at clamping mechanism 12 about angle D. Angle D is the angle upon which the Ergonomic Grip for Weed Trimmer device may be rotated relative to standard grip 4 and main shaft 16. This allows user 2 to position ergonomic grip 10 parallel, perpendicular, or any position between parallel and perpendicular, to standard grip 4. Straight shaft 34 may be reversibly positioned along line E per user 2 preference. Line E is the line upon which ergonomic grip 10 may be positioned relative to standard grip 4 and main shaft 16. Positioning clamping mechanism 12 about main shaft 16 at fulcrum F2 allows straight shaft 34 to be positioned and re-positioned along line E.

Figure 4:
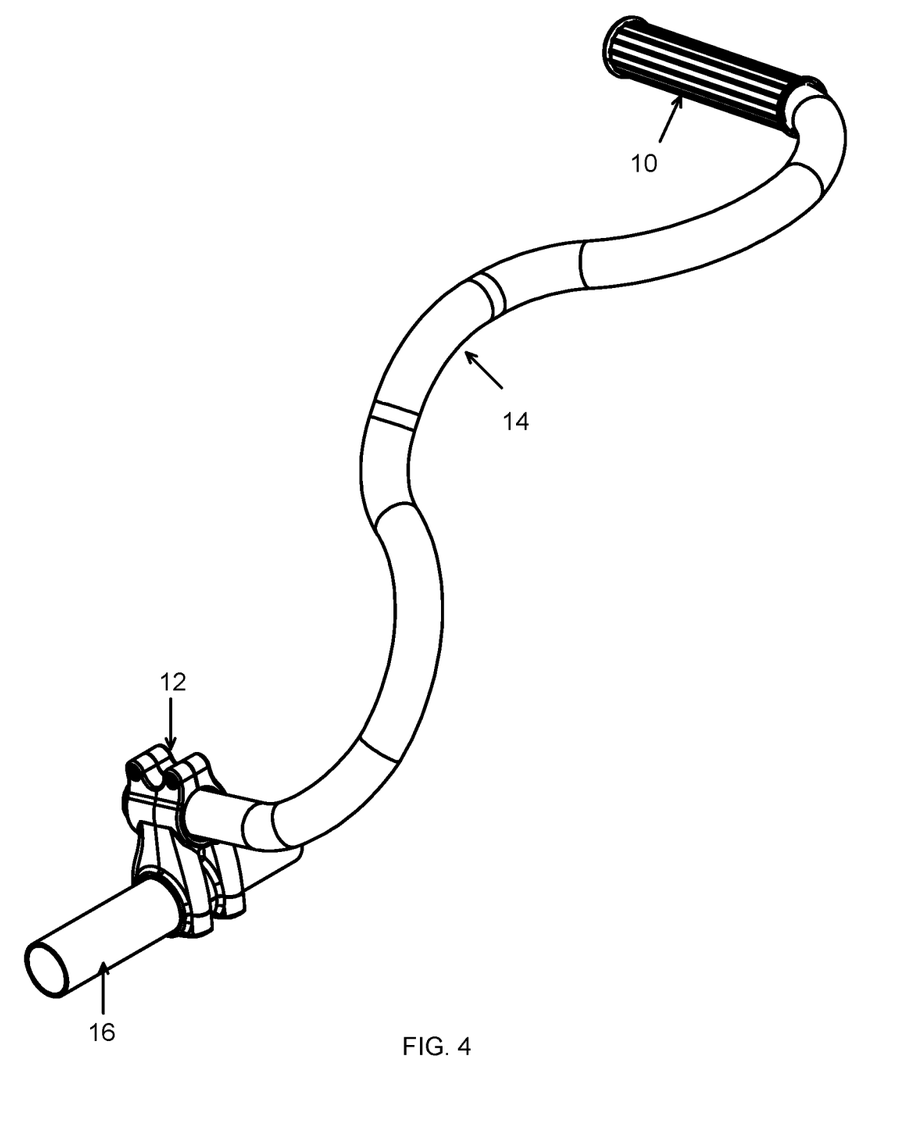
FIG. 4 shows an angled, side view of the device of FIG. 2 with the weed trimmer handle cut away.

FIG. 4 depicts the device herein attached to main shaft 16 of a grass trimmer or grass edger wherein that portion wherein the device is coupled to main shaft 16 has been cut away from the device. Ergonomic grip 10 is formed to be easily and strongly gripped by a user without causing fatigue and/or strain. Ergonomic grip 10 is shown positioned above main shaft 16 and perpendicular to main shaft 16. Clamping mechanism 12 may be any mechanism that allows the device to be coupled firmly to main shaft 16. The point wherein clamping mechanism 12 clamps onto main shaft 16 is fulcrum F2 upon which the user manipulates trimmer head 7. Shaft 14 runs the length from clamping mechanism 12 to ergonomic grip 10. Shaft 14 may be curved to allow a user to place a second hand upon the device to enable a user to manipulate the grass trimmer or grass edger in a sweeping manner. Shaft 14 is formed so that ergonomic grip 10 is positioned above or to the side of main shaft 16.

Figure 6:
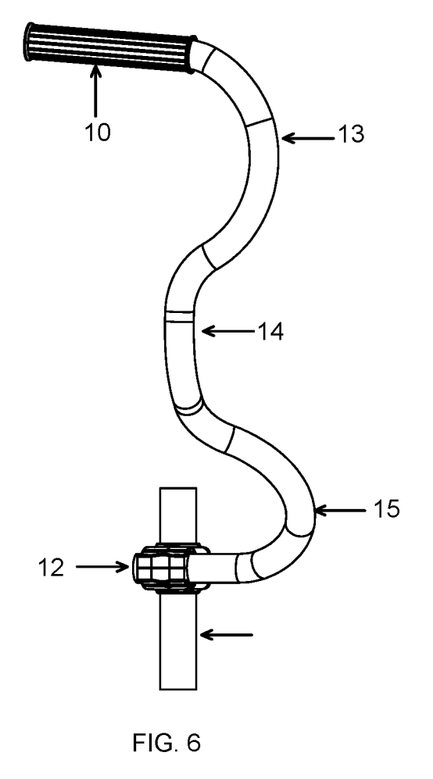
FIG. 6 illustrates a top view of the device of FIG. 4.

FIG. 6 depicts a top view of the device of FIG. 4. Clamping mechanism 12 couples the device to main shaft 16. Ergonomic grip 10 is shown perpendicular to main shaft 16. But, a user may rotate shaft 14 so that ergonomic grip 10 is parallel to main shaft 16, or some position between perpendicular and parallel, as noted above. Shaft 14 includes curved segments 13 and 15 that are connected to each other by second handle 17, which allows a user to place a hand upon the shaft when needed to permit better control over the movement of the grass trimmer or edger.

Figure 5:
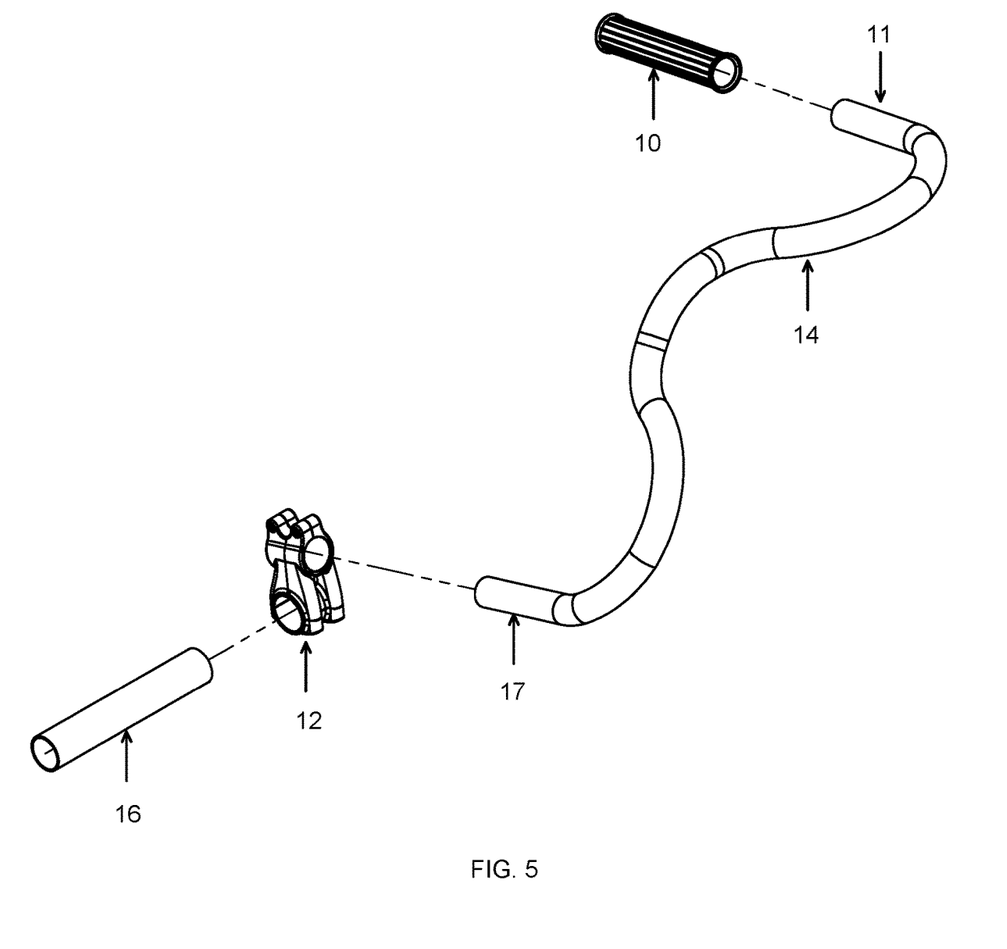
FIG. 5 illustrates an exploded view of the device of FIG. 4.
Figure 7:
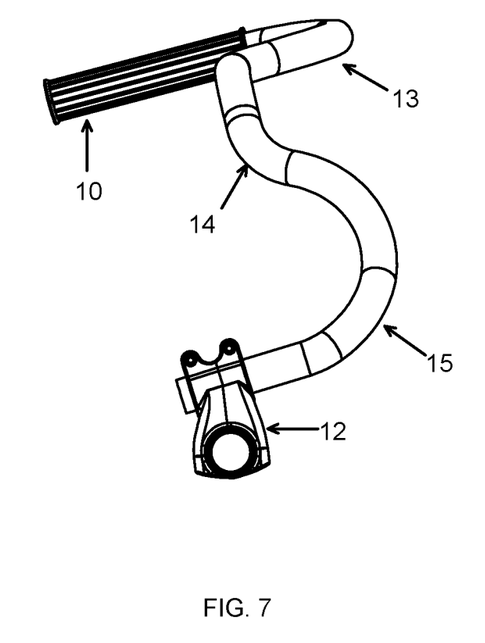
FIG. 7 is a bottom view of the device of FIG. 4.
Figure 8:
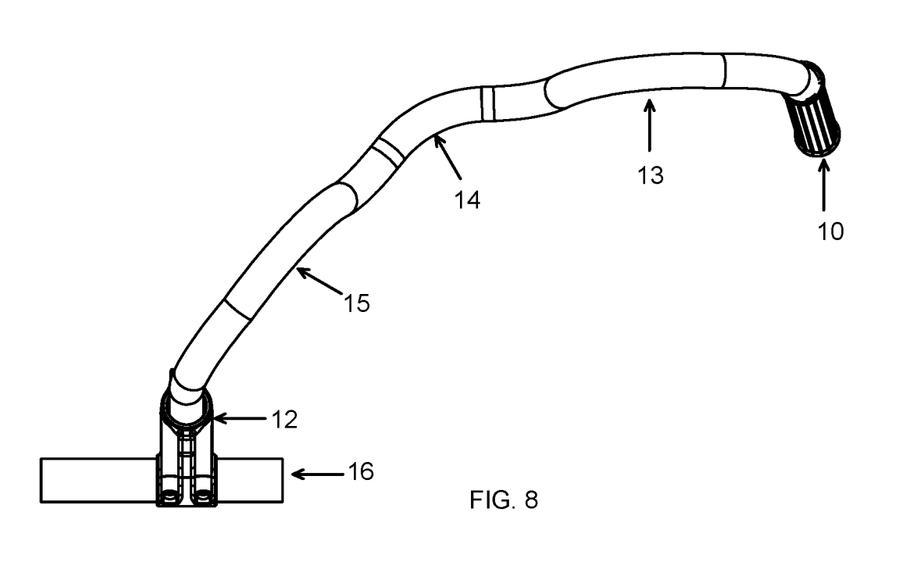
FIG. 8 depicts a side view of the device of FIG. 4.

A bottom view of the device is shown in FIG. 7. Note that ergonomic grip 10 is perpendicular to second handle 17. Curved segments 13 and 15 curve from ergonomic grip 10 and clamping mechanism 12, respectively, to second handle 17. A side view of the device of FIG. 5 is shown in FIG. 8. Ergonomic grip 10 is perpendicular to both main shaft 16 and second handle 17. Clamping mechanism 12 clamps the device onto main shaft 16. Curved segments 13 and 15 allow second handle 17 to run parallel to main shaft 16.

Figure 9:
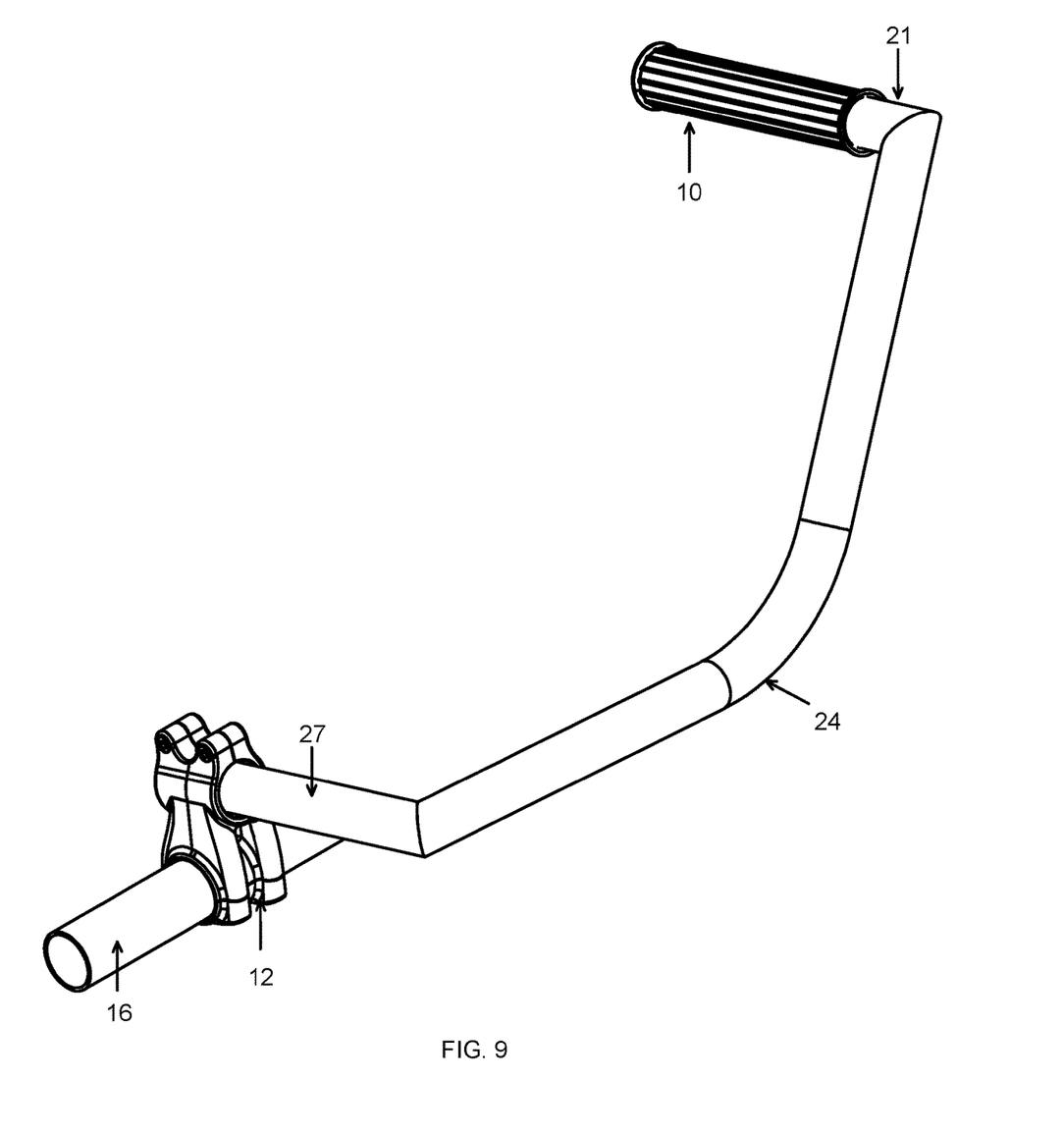
FIG. 9 is a side, angled view of the device with an angled shaft wherein the weed trimmer handle has been cut away.

An angled, side view of an alternate embodiment of the device with angled shaft 24 cut away from main shaft 16 of the grass trimmer is shown in FIG. 9. Ergonomic grip 10 is perpendicular to main shaft 16. Clamping mechanism 12 clamps the device onto main shaft 16. Clamping mechanism 12 may be reversibly clamped onto main shaft 16 in any desired position including at an angle extending perpendicular to standard grip 4 (not shown). Alternatively, the device may be clamped onto main shaft 16 so that ergonomic grip 10 is parallel to standard grip 4 (shown in FIGS. 2 and 3). Angled shaft 24 allows ergonomic grip 10 to be positioned above or to the side of standard grip 4. Angled shaft 24 may be formed at an angle less than perpendicular so that ergonomic grip 10 may be gripped by a user so that the user's hand is perpendicular to main shaft 16. Angled shaft 24 may be composed of aluminum, steel, or any other material of sufficient strength to support the operation of a weed trimmer or edger. And, angled shaft 24 may be coated with a material to make it easier for a user to grip along the length of angled shaft 24.

Figure 10:
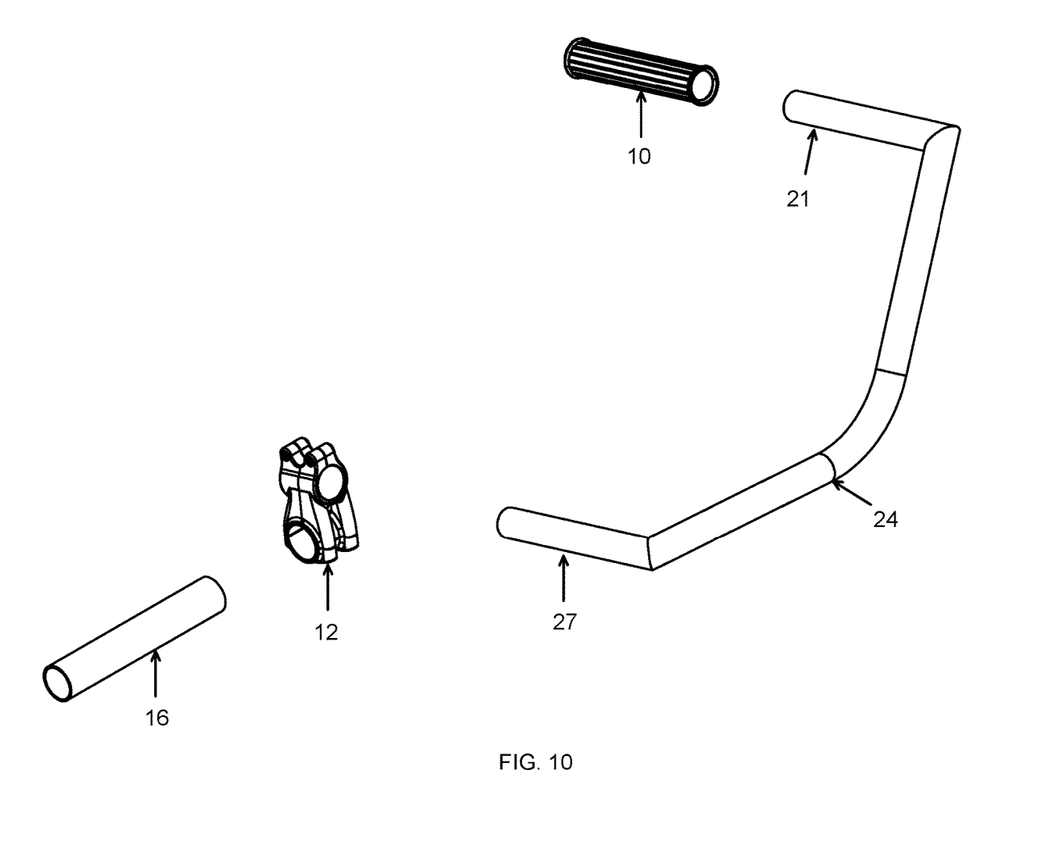
FIG. 10 is an exploded view of FIG. 9.

An exploded view of FIG. 9 is depicted in FIG. 10. Angled shaft 24 is coupled to ergonomic shaft 21 and clamping shaft 27. Ergonomic grip 10 is positioned onto ergonomic shaft 21. Clamping shaft 27 fits within clamping mechanism 12. Clamping mechanism 12 fits onto main shaft 16 of the trimmer/edger device. Angled shaft 24 positions ergonomic grip 10 so that a user may grip the weed trimmer or edger device with less stress and strain on a user's back and waist than with a standard weed trimmer or edger grip.

Figure 11:
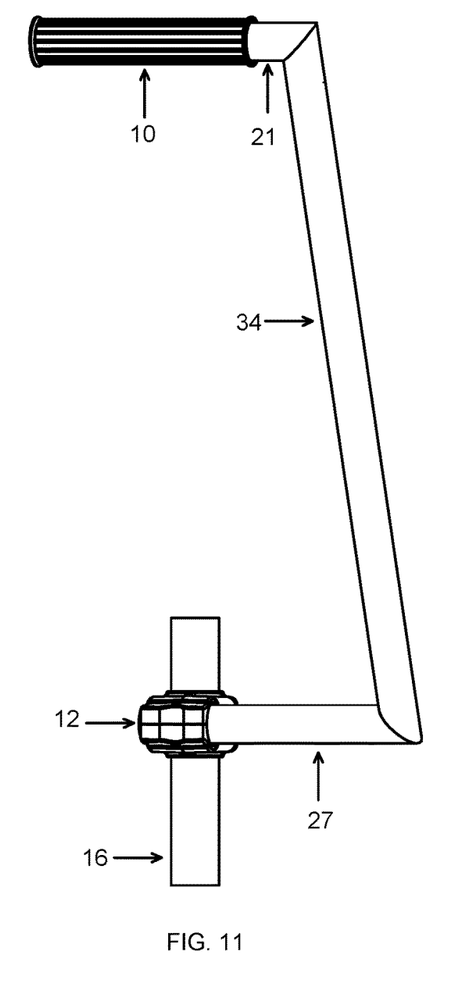
Figure 12:
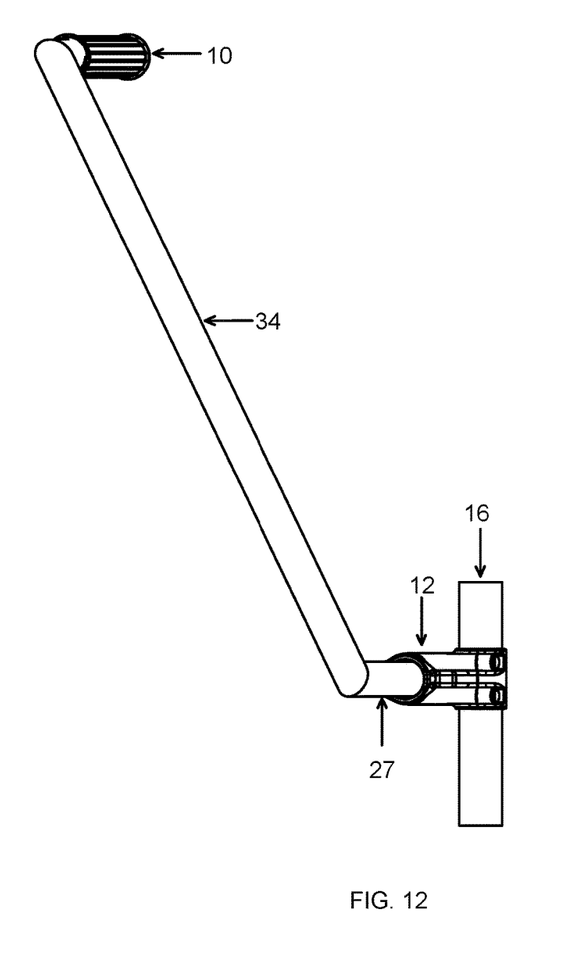
FIG. 12 is a side view.

FIG. 11 shows a top view of the device of FIG. 3, while FIG. 12 depicts a side view. FIG. 11 illustrates straight shaft 34 positioning ergonomic grip 10 perpendicular to main shaft 16. Ergonomic grip 10 is formed onto or coupled with ergonomic shaft 21. Straight shaft 34 connects ergonomic grip 10 to clamping shaft 27. Straight shaft 34 extends ergonomic grip 10 above main shaft 16. Clamping mechanism 12 may be reversibly positioned along main shaft 16 positioning ergonomic grip 10 in a position that is comfortable during operation of the trimmer or edger. Additionally, clamping mechanism 12 may be positioned about main shaft 16 so that ergonomic grip 10 is either parallel, perpendicular, or some position between parallel and perpendicular relative to standard grip 4. The position that a user grips ergonomic grip 10 may be manipulated relative to main shaft 16 by rotating clamping shaft 27 within clamping mechanism 12, which alters the angle that a user grips the device.

Clamping mechanism 12 permits the device to be reversibly coupled to main shaft 16. Both ergonomic shaft 21 and clamping shaft 27 may run perpendicular to main shaft 16. FIG. 12 depicts ergonomic grip 10 above and perpendicular to main shaft 16. The angle of the device relative to main shaft 16 may be manipulated by rotating clamping shaft 27 within clamping mechanism 12.

Figure 13:
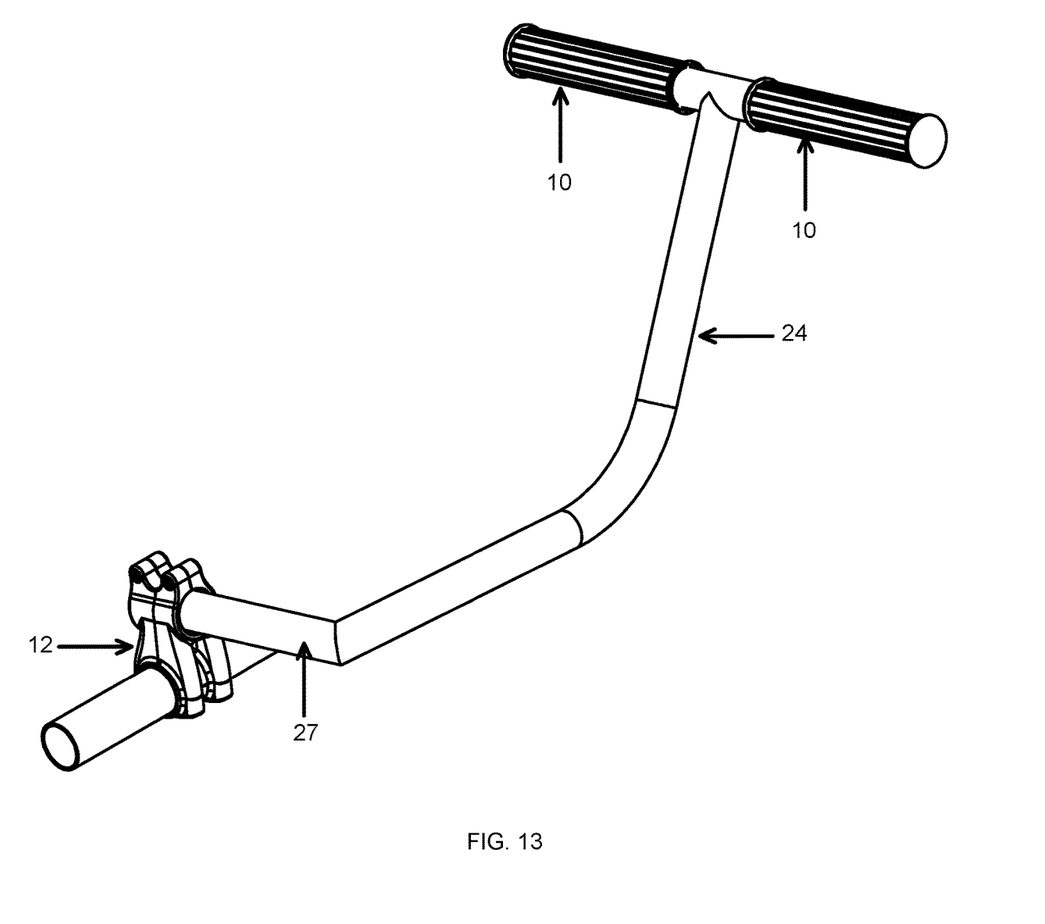
FIG. 13 is a side, angled view of the device of FIG. 9 with a "T" shaped ergonomic handle.

A side, angled view of the device of FIG. 9 with a "T" shaped handle is shown in FIG. 13. Angled shaft 24 includes two ergonomic grips 10 opposite each other forming a "T" shape. The "T" shape allows a user to have more flexibility in gripping the weed trimmer or edger during operation. Ergonomic grip 10 and clamping shaft 27 are parallel to each other and perpendicular to angled shaft 24. Clamping mechanism 12 is secured onto clamping shaft 27.

What is claimed is:

1. A handle attachment for a weed trimmer having a main shaft, the main shaft including a proximal end and a distal end to which the trimmer head is attached opposite the proximal end, the handle attachment comprising:
   a clamping mechanism coupled to the main shaft closer to the distal end than to the proximal end;
   a shaft coupled to the clamping mechanism and configured to extend towards the proximal end of the main shaft, the shaft including a lower shaft portion defining a first shaft end, an upper shaft portion defining a second shaft end, and a curved portion positioned between the lower shaft portion and the upper shaft portion, the lower shaft portion, the upper shaft portion, and the curved portion defining a shaft plane parallel to and offset from the main shaft of the weed trimmer, the shaft further including an ergonomic shaft extending from the second end toward the main shaft and a clamping shaft extending from the first end toward the main shaft, the clamping shaft coupled to the clamping mechanism; and
   a grip coupled to the ergonomic shaft, the grip positioned closer to the proximal end of the main shaft than to the distal end of the main shaft.

2. The handle attachment of claim 1, wherein:
   an offset of the grip above the main shaft of the weed trimmer is adjustable by adjusting a position of the shaft within the clamping mechanism.

3. The handle attachment of claim 1, wherein:
   the clamping mechanism is reversibly couplable to the main shaft of the weed trimmer to adjust a position of the shaft relative to the main shaft.

4. The handle attachment of claim 1, wherein:
   the clamping shaft is rotatably adjustable within the clamping mechanism to adjust and fix an offset of the ergonomic shaft relative to the main shaft of the weed trimmer.

5. The handle attachment of claim 1, wherein:
   the clamping shaft is positioned perpendicular to the shaft plane.

6. The handle attachment of claim 1, wherein:
   the lower portion of the shaft is angled relative to the upper portion of the shaft.

7. The handle attachment of claim 1, wherein:
   the clamping mechanism defines a fulcrum point positioned closer to the distal end of the main shaft than to the proximal end of the main shaft for improved control of the trimmer head using the grip.

8. The handle attachment of claim 1, wherein:
   the clamping mechanism is configured to fixedly position the shaft relative to the main shaft of the weed trimmer.

9. The handle attachment of claim 1, wherein:
   the ergonomic shaft is parallel to the clamping shaft.

10. The handle attachment of claim 1, wherein:
    the ergonomic shaft is perpendicular to the shaft plane.

11. A handle attachment for a weed trimmer having a main shaft, the main shaft including a proximal end and a distal end to which the trimmer head is attached opposite the proximal end, the handle attachment comprising:
    a clamping mechanism coupled to the main shaft closer to the distal end than to the proximal end;
    a shaft coupled to the clamping mechanism and configured to extend towards the proximal end of the main shaft, the shaft including a first end with a clamping shaft extending therefrom and a second end with an ergonomic shaft extending therefrom parallel to the clamping shaft, both the clamping shaft and the ergonomic shaft positioned perpendicular to the main shaft of the weed trimmer, the shaft further including a first shaft portion positioned terminating at the first end, a second shaft portion terminating at the second end, and a curved portion positioned between the first shaft portion and the second shaft portion, the first shaft portion, the second shaft portion, and the curved portion defining a shaft plane parallel to the main shaft of the weed trimmer; and
    a grip coupled to the ergonomic shaft, wherein the clamping mechanism defines a fulcrum point configured to enable a user to control a position of the trimmer head using the grip.

12. The handle attachment of claim 11, wherein:
    the grip is configured to be positioned closer to the proximal end of the main shaft of the weed trimmer than to the distal end of the main shaft.

13. The handle attachment of claim 11, wherein:
    the clamping mechanism is configured to fix a position of the shaft relative to the main shaft of the weed trimmer.

14. The handle attachment of claim 11, wherein:
    the first shaft portion is angled relative to the second shaft portion.

15. The handle attachment of claim 11, wherein:
    each of the clamping shaft and the ergonomic shaft are perpendicular to the shaft plane.

16. The handle attachment of claim 11, wherein:
the clamping mechanism is reversibly couplable to the main shaft of the weed trimmer to adjust a position of the shaft relative to the main shaft.
17. The handle attachment of claim 11, wherein:
the clamping shaft is rotatably adjustable within the clamping mechanism to adjust and fix an offset of the ergonomic shaft relative to the main shaft of the weed trimmer.
18. The handle attachment of claim 11, wherein:
the grip covers a majority of the ergonomic shaft.

\* \* \* \* \*